April 12, 1949.  E. R. MAURER ET AL  2,466,721
FLUID COUPLING WITH LOCKUP CLUTCH
Filed April 20, 1944
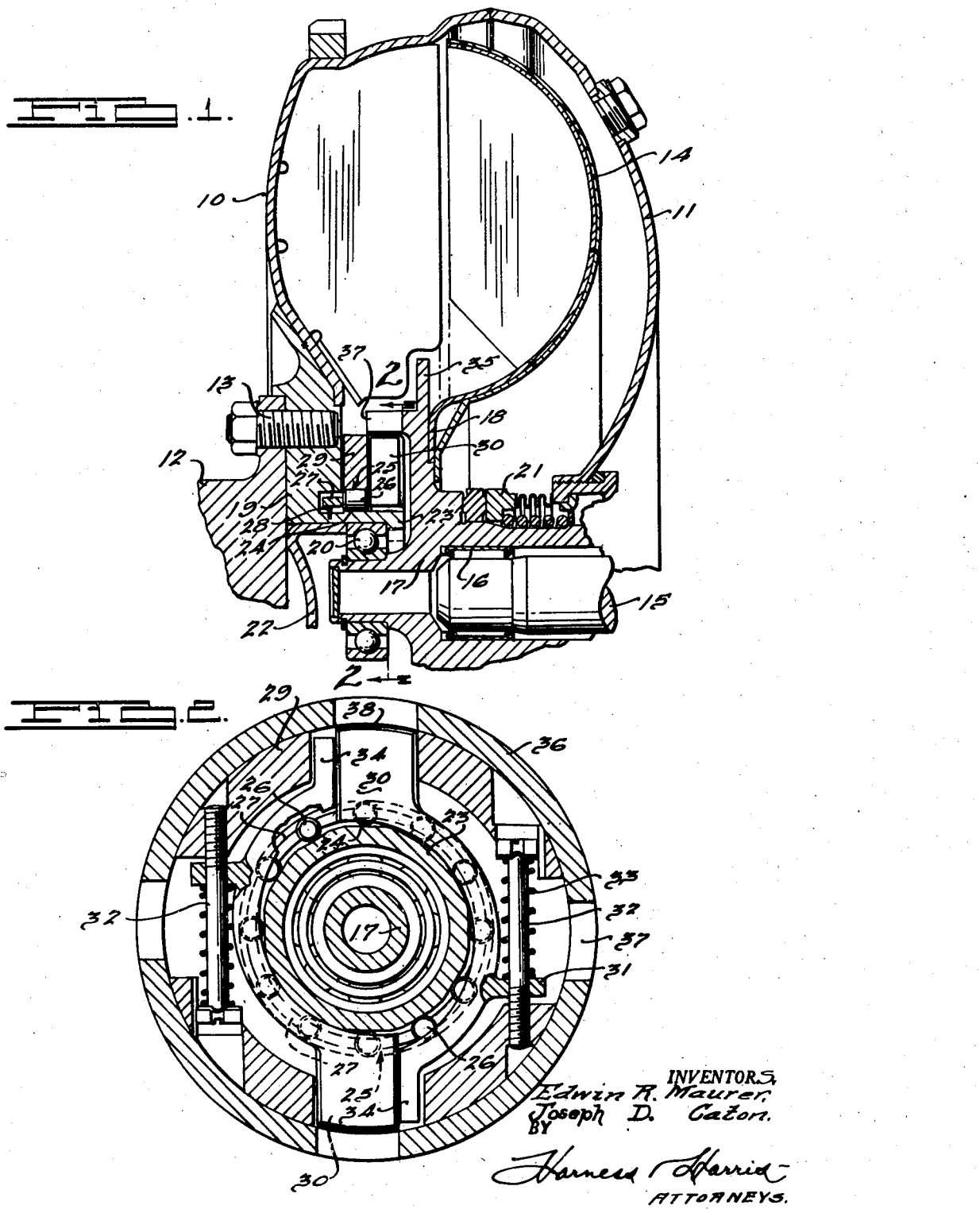
INVENTORS
Edwin R. Maurer,
Joseph D. Caton.
BY
Harness & Harris
ATTORNEYS.

Patented Apr. 12, 1949

2,466,721

UNITED STATES PATENT OFFICE 2,466,721

FLUID COUPLING WITH LOCKUP CLUTCH

Edwin R. Maurer and Joseph D. Caton, Detroit, Mich., assignors to Chrysler Corporation, Highland Park, Mich., a corporation of Delaware Application April 20, 1944, Serial No. 531,868

10 Claims. (Cl. 192—3.2)

This invention relates to "fluid drives," and particularly to means for improving the overall operating efficiency of fluid drive devices.

During recent years, fluid couplings have come into wide use in motor vehicles for coupling the engine to the driving wheels. These fluid couplings usually consist of two members, an "impeller" which is driven by the engine, and a "runner" which is connected to the vehicle axle through a change speed transmission.

The inherent "slip" between the two coupling members during operation gives flexibility to the performance of the vehicle, reduces gear shifting and provides smoothness of power transmission. This slip varies from 100% when the runner is stationary with the impeller rotating, to approximately 2% when the vehicle is running at cruising speed under normal load.

While the aforementioned slipping characteristic is of great advantage during low speed operation of the vehicle, it is not particularly necessary or desirable during medium and high speed operation, and in many instances is objectionable. For example, even the two per cent slip normally present at cruising speeds wastes fuel, and as this slip increases at lower speeds and when an additional load is suddenly thrown on the engine by rapid acceleration, ascending hills, etc., considerable waste of fuel may occur, especially in hilly country.

The prime object of the present invention then, is to provide a simple, easily manufactured, foolproof, and completely automatic device for use in connection with fluid couplings which functions to eliminate the slip when the latter is undesirable while permitting the coupling to slip when such is desirable.

Another advantage in the invention resides in the fact that elimination of slip at vehicle cruising speeds will permit great flexibility in the design and construction of the coupling, because formerly emphasis was placed on the attainment of maximum efficiency at cruising speeds to the exclusion of other desirable operating characteristics.

For example, by designing the coupling such that it has a relatively high stall speed, slip at engine idling speed may be actually increased and thus tendency for the vehicle to creep at idling speed is eliminated.

Other objects and advantages will be apparent to those skilled in the art from a reading of the following description, which taken in connection with the accompanying drawings, illustrates a preferred embodiment of the invention.

In the drawings,

Fig. 1 is a longitudinal vertical section of the upper portion of a fluid coupling incorporating the slip eliminator.

Fig. 2 is a section along the line 2—2 of Fig. 1.

Referring to the drawing, 10 designates the fluid coupling impeller which has a housing portion 11 for enclosing the runner 14. The impeller is fastened to the crankshaft 12 by studs 13 in accordance with usual practice. The driven shaft 15 is piloted by means of an anti-friction bearing 16 into the runner hub 17 to which the runner 14 is welded at 18. The hub 17 is, in turn, piloted into the impeller hub 19, as anti-friction bearing 20 being disposed between the members.

The usual seal 21 is provided between the housing 11 and the runner hub to prevent the escape of the coupling fluid. A front seal 22 prevents leakage at the forward portion of the assembly.

The impeller hub 19 has a rearwardly projecting annular portion 23 on which is formed at 24 a series of cams. These cams form one element of a roller clutch 25 having rollers 26 held in place by a cage 27; a wrap type of spring 28 being provided to energize the clutch.

The other element of the clutch 25 is formed by a pawl drive plate 29 which has an inner cylindrical surface in engagement with the rollers 26 and carries a pair of centrifugally actuated pawls 30. The pawls are an element of a centrifugal clutch and have ears 31 for loosely engaging bolts 32 (see Fig. 2). The bolts 32 are rigidly carried in the pawl drive plate 29 as shown and mount a coiled compression spring 33 which tends to keep the pawls 30 in retracted position. The pawls are shaped as illustrated and each has an integral tail portion 34 which lies alongside the engaging portion of the other pawl and acts as a driving connection between the pawl and the plate 29 as well as a guide to keep the pawls in position. The pawls loosely embrace the hub portion 23 and have sufficient clearance with respect thereto such that they can move radially outwardly under the influence of centrifugal force. This movement is limited in both directions by engagement of the inner surface of the pawls with the hub portion 23 as will be understood.

The springs 33 may be of any desired strength to produce the operating characteristics desired, it being understood that the springs will keep the pawls in the illustrated retracted position until a predetermined speed of the shaft 12 is reached whereup the centrifugal force will overcome the force of the springs and the pawls will tend to move radially outwardly as will be explained below.

The runner hub 17 has the well known baffle 35 for reducing the efficiency of the coupling at idling speed and for preventing surges and is also formed with a forwardly projecting annular portion 36 provided with circumferentially spaced notches 37. Four notches are shown, but more may be required in some installations, just as more than two pawls may be required for smooth operation.

The notches 37 are radially aligned with the pawls 30 such that the pawls may engage the notches to lock the drive plate 29 to the runner hub 17. The pawls 30 are formed with an outer cammed surface 38 which is shaped such that when the pawls are urged outwardly by centrifugal force and the member 36 is rotating at a different speed than the plate 29, the surfaces 38 will engage the edge of the notches 37 and cam the pawls inwardly until the speeds of the two members are substantially equal whereupon the pawls will enter the notches.

The operation of the device is as follows:

Let it be assumed that the strength of springs 33 is such that the pawls will be maintained in retracted position up to about 800 R. P. M. of the impeller 10, this corresponding roughly to a 20 M. P. H. speed of the vehicle in direct drive.

The vehicle will then be driven through the coupling with the usual slip between the impeller 10 and the runner 14, and the pawl drive plate 29 and pawls 30 will be driven at engine speed through lock up of the overrunning clutch 25. After the engine speed reaches a value above 800 R. P. M. the force of springs 33 will be overcome and the pawls 30 will be urged outwardly but will be prevented from moving because of the difference in speeds between the members 29 and 36, the plate 29 overrunning the member 36 because of the lag of the runner 14.

When the driver has reached a satisfactory car speed above 20 M. P. H. he releases the throttle control momentarily which causes a drop in speed of the impeller 10 and pawl drive plate 29. The latter will then rapidly reach the speed of the runner 14 and member 36 and at the instant of synchronization the pawls will move out into the notches 37. The impeller 10 and runner 14 will then be directly connected and acceleration of the vehicle will cause it to operate without slip.

The pawls 30 once engaged will remain engaged at all speeds above 800 R. P. M. of shaft 12 and down to a slightly lower speed because of the friction between the pawls and the sides of the notches 37. At some speed below the engaging speed, the springs 33 will pull the pawls out of the notches and the vehicle will again be in slip drive. If the throttle is released and the engine is driving the car when the speed of the runner 14 comes down to the pawl cut-in speed, the pawls will drop out sooner because there is less force tending to hold them in the notches due to the fact that the pawl drive plate 29 is free-wheeling with respect to the impeller 10.

It will thus be seen that while the coupling is locked up and slip is eliminated when the engine is driving the vehicle, when the vehicle is driving the engine slip is present because of the overrunning clutch 25 which permits the pawl assembly to overrun the hub 19.

The overrunning roller clutch 25 has another and more important function in that it prevents possible damage to the pawls 30 and notches 37 when the car is coasting with a dead engine and when it is being towed or pushed. In such instances, if the roller clutch was omitted and the pawl plate 29 driven directly from the hub 19, there would be an outward movement of the pawls when the speed of the impeller reached the pawl cut-in speed (the impeller being driven by the runner with the runner turning faster than the impeller) and damage might result because the cammed ends 38 are formed to cam the pawls inwardly when they tend to engage with the impeller turning faster than the runner, but not vice-versa. This is an important safety feature and renders the device foolproof.

The invention is particularly adapted for use with transmissions of the semi-automatic step-up type such as those described in Syrory Patent No. 2,277,799, granted March 31, 1942; Dunn Patent No. 2,159,429, granted May 23, 1939; and Maurer Patent No. 2,154,575, granted April 18, 1939. In driving a vehicle equipped with one of these transmissions, the driver accelerates the car in a low speed gear ratio to a speed above the engagement speed of an automatically actuated clutch means, then releases the throttle momentarily whereupon the clutch means engages to establish a higher gear ratio (usually direct drive) during a short free-wheeling period. Further details of these transmissions can be had by reference to the above cited patents.

When the present invention is installed on a vehicle having such a transmission (or a similar type) the cut-in speed of the pawls 30 can be set to coincide with the speed of engagement of the transmission step-up clutch means whereupon simultaneous operation of the two clutch means may be obtained during one short period of throttle release. Such a combination provides extremely pleasing operation and "feel" of the vehicle without entailing any additional effort or thought on the driver's part.

Having thus described a physical embodiment of the invention for purposes of illustration, it is to be understood that such is by way of example only and it is not intended to limit the invention in its broader aspects except as set forth in the claims appended below.

We claim:

1. In combination with a fluid coupling having a driving element, a driven element and a fluid operable therebetween as a driving means, a pawl drive plate disposed between said elements; centrifugally actuated pawls carried by said plate; means carried by said driven element for engaging said pawls; and an overrunning drive connection immediately between said driving element and said plate.

2. In combination with a fluid coupling having a driving element, a driven element and a fluid operable therebetween as a driving means, a pawl drive plate disposed between said elements; centrifugally actuated pawls carried by said plate; means carried by said driven element for engaging said pawls, the said pawls being arranged and constructed such that they are adapted to lock said plate to said driven element at certain predetermined synchronous speeds of said elements; and means for establishing an overrunning drive connection immediately between said plate and said driving element.

3. In combination with a fluid coupling having a driving element, a driven element and a fluid operable therebetween as a driving means, a pawl drive plate disposed between said elements; centrifugally actuated pawls carried by said plate;

means carried by said driven element for engaging said pawls, the said pawls being arranged and constructed such that they are adapted to lock said plate to said driven element at certain predetermined synchronous speeds of said elements; and means for establishing an overrunning drive connection between said plate and said driving element comprising a roller clutch carried by said driving element and immediately between said plate and driving element.

4. In a drive for a motor vehicle having an engine and a driven member, the combination of a fluid coupling adapted to transmit drive from said engine to said member, additional means adapted to establish a positive drive between said engine and said member said means including a centrifugally actuated drive control element driven by said engine and operable at a predetermined engine speed to effect this positive drive, and an overrunning drive connection immediately drivingly between said element and said engine.

5. In a drive for a motor vehicle having an engine and a driven member, a fluid power transmitting device including a vaned impeller adapted to be driven by said engine and a vaned runner to drive said driven member, engine speed responsive means for positively clutching said impeller and runner together whereby to establish a positive drive of said member by said engine above predetermined engine speeds and an overrunning drive connection between said engine and said means.

6. In combination with a fluid coupling having a driving element, a driven element and a fluid operable therebetween as a driving means, speed responsive mechanical means driven by said driving element and adapted to effect a positive drive connection with the said driven element when said mechanical means is driven at a predetermined speed and an overrunning drive connection between said driving element and said mechanical means.

7. In combination with a fluid power transmitting device having a vaned input member and a vaned output member, a centrifugal pawl clutch operable at a predetermined speed to directly clutch said input and output members in drive, and an overrunning roller clutch drivingly positioned between said input member and said centrifugal clutch, said roller clutch having an inner element and an outer element and said pawl clutch having its centrifugal pawls drivingly connected to said outer element.

8. In combination with a fluid coupling having a driving element, a driven element and a fluid operable therebetween as a driving means, a female clutch member carried by said driven element and positively connected thereto; centrifugally actuated male clutch means carried by the driving element and operably associated with said female clutch member and engageable therewith; and an overrunning drive connection immediately between said male clutch means and said driving element.

9. In combination with a fluid coupling having a driving element, a driven element and a fluid operable therebetween as a driving means, female clutch means carried by said driven element and positively connected thereto; centrifugally actuated male clutch means carried by the driving element and operably associated with said female clutch means and engageable therewith; an overrunning drive connection immediately between said male clutch means and said driving element; and means for causing engagement of said clutching means at a certain predetermined speed of said driving element.

10. In combination with a fluid coupling having a driving element, a driven element and a fluid operable therebetween as a driving means, female clutch means carried by said driven element and positively connected thereto; centrifugally actuated male clutch means operably associated with said female clutch means and interengageable therewith; an overrunning drive connection immediately between said male clutch means and said driving element operable when said clutch means are drivingly engaged to establish a positive drive between said elements when said driving element tends to overrun said driven element while permitting said driven element to overrun said driving element.

EDWIN R. MAURER.
JOSEPH D. CATON.

REFERENCES CITED

The following references are of record in the file of this patent:

UNITED STATES PATENTS

| Number | Name | Date |
| --- | --- | --- |
| 1,855,967 | Jandasek | Apr. 26, 1932 |
| 2,019,745 | Swennes | Nov. 5, 1935 |
| 2,267,334 | Keller | Dec. 23, 1941 |
| 2,354,596 | Jandesak | July 25, 1944 |
| 2,360,124 | Greenlee | Oct. 10, 1944 |
| 2,360,646 | Carnagua | Oct. 17, 1944 |